United States Patent [19]
Wu et al.

[11] Patent Number: 6,021,482
[45] Date of Patent: Feb. 1, 2000

[54] EXTENDED PAGE MODE WITH A SKIPPED LOGICAL ADDRESSING FOR AN EMBEDDED LONGITUDINAL REDUNDANCY CHECK SCHEME

[75] Inventors: Frank Yuhhaw Wu, Fremont; Steven K. Peng, Cupertino, both of Calif.

[73] Assignee: Seagate Technology, Inc., Scotts Valley, Calif.

[21] Appl. No.: 09/007,618

[22] Filed: Jan. 15, 1998

Related U.S. Application Data

[60] Provisional application No. 60/053,432, Jul. 22, 1997.

[51] Int. Cl.$^7$ ........................................... G06F 12/00
[52] U.S. Cl. ............................. 711/217; 711/202
[58] Field of Search ................... 711/202, 203, 711/210, 217, 218

[56] References Cited

U.S. PATENT DOCUMENTS

| | | | |
|---|---|---|---|
| 3,469,241 | 9/1969 | Barton et al. | 711/203 |
| 5,067,105 | 11/1991 | Borkenhagen et al. | 711/202 |
| 5,280,601 | 1/1994 | Desai et al. | 711/5 |
| 5,355,463 | 10/1994 | Moeller | 711/203 |
| 5,379,410 | 1/1995 | Okada | 714/8 |
| 5,587,964 | 12/1996 | Rosich et al. | 365/238.5 |
| 5,652,860 | 7/1997 | Sato | 711/154 |
| 5,675,770 | 10/1997 | Ogata | 711/173 |
| 5,774,135 | 6/1998 | Letham | 711/271 X |
| 5,784,707 | 7/1998 | Khalidi et al. | 711/203 X |
| 5,895,503 | 4/1999 | Belgard | 711/203 X |

*Primary Examiner*—David L. Robertson
*Attorney, Agent, or Firm*—Merchant & Gould PC

[57] ABSTRACT

The present disclosure concerns a method and apparatus for mapping each of a plurality of logical addresses to a physical address identifying a location in a memory device. The memory device has a plurality of columns and rows, wherein each row has a plurality of data paragraphs including data and at least one parity paragraph including parity data. Each paragraph is comprised of a plurality of contiguous columns. A physical address identifies a location of a paragraph in the memory device. To map the logical addresses to physical addresses, a determination must be made as to whether the row and column portions of each logical address identify a physical address location including parity data. If a logical address identifies a physical address location in the memory device including parity data, then the logical address is incremented until the row and column portions of the logical address identify a physical address location not including parity data. The mapping is then conducted by setting the column and row portions of the physical address to the column and row portions of one of the: (i) logical address upon determining that the logical address does not identify a physical address location including parity data and (ii) the incremented logical address upon determining that the logical address identifies a physical address location including parity data.

27 Claims, 5 Drawing Sheets

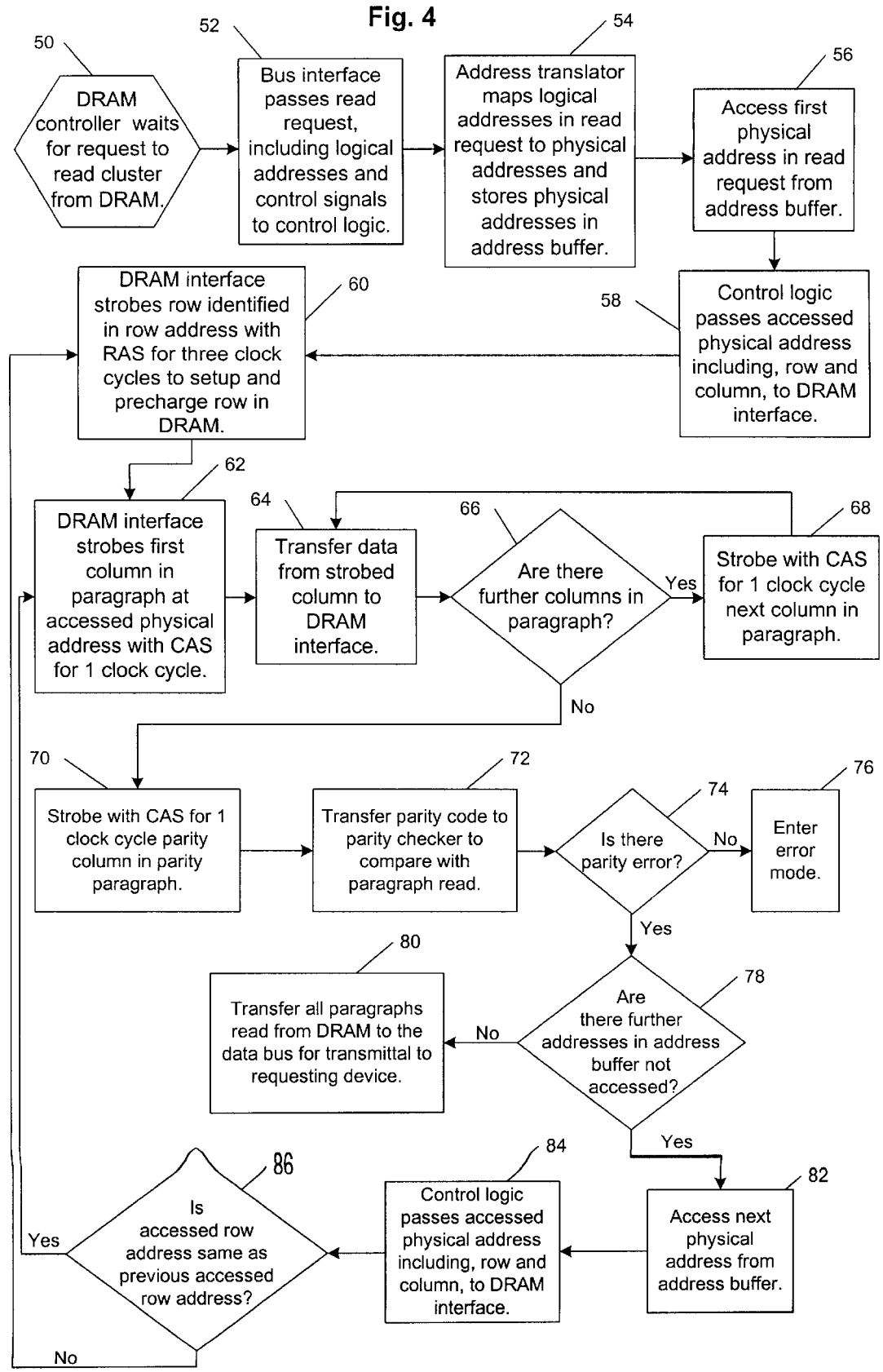

EXTENDED PAGE MODE WITH A SKIPPED LOGICAL ADDRESSING FOR AN EMBEDDED LONGITUDINAL REDUNDANCY CHECK SCHEME

CROSS-REFERENCE TO RELATED APPLICATIONS

This application claims the benefit under 35 U.S.C. § 119(e) of U.S. Provisional application Ser. No. 60/053,432, filed Jul. 22, 1997 for an "Extended Page Mode With a Skipped Logical Addressing for Embedded LRC Scheme," by Frank Yuhhaw Wu and Steven K. Peng, which application is also hereby incorporated by reference in its entirety.

This application is related to the co-pending and commonly-assigned U.S. patent application Ser. No. xx/xxx, xxx, filed on same date herewith, by Frank Yuhhaw Wu and Steven K. Peng, entitled "Extended Page Mode With A Linear Shift Register Converted Addressing Scheme," attorney's docket number 30874.06USU1.

BACKGROUND OF THE INVENTION

1. Field of the Invention

The present invention relates generally to a method and apparatus for accessing a memory device and, in preferred embodiments, a method and apparatus which utilizes an address counter with skipped logic to translate logical addresses to physical addresses to be accessed in a dynamic random access memory (DRAM).

2. Description of Related Art

Volatile storage devices, such as dynamic random access memories (DRAMs), are often used with magnetic storage media to provide buffer memory to temporarily store character information. When other devices, such as non-volatile storage media, access the DRAM, they present logical addresses representing locations in the DRAM where a selected read or write operation will be performed. These logical addresses must be translated to corresponding physical addresses in the DRAM, which are used when performing read/write operations.

Typically, an error checking method is used to detect possible corruption of data stored in the DRAM. One such error checking method involves adding a parity code to each block of data written to the DRAM. This parity code is later used to detect errors in the block of data when it is read out from the DRAM. However, adding a parity code to a block of data in the DRAM complicates the positioning of the data within the DRAM because the parity code interrupts the contiguous storage of data in the DRAM.

Moreover, a system must be provided to map the logical memory address to a physical address in the DRAM. Various methods for translating a logical to a physical address are known in the art, such as the translation methods disclosed in U.S. Pat. No. 5,280,601, entitled "Buffer Memory Control System for a Magnetic Disc Controller," to Dhiru N. Desai et al., assigned to Seagate Technology, Inc., the assignee of the subject application and U.S. Pat. No 5,652,860, entitled "Memory Control Device," to Fumiki Sato, which patents are incorporated by reference herein in their entirety. Prior art translation techniques often involve the use of page tables to map the logical address to the physical address. However, page table techniques often noticeably increase DRAM access time.

SUMMARY OF THE DISCLOSURE

To address the shortcomings in the prior art described above, preferred embodiments of the present invention provide a system for mapping each of a plurality of logical addresses to a physical address identifying a location in a memory device. The memory device has a plurality of columns and rows, wherein each row has a plurality of data paragraphs including data and at least one parity paragraph including parity data. Each paragraph is comprised of a plurality of contiguous columns. A physical address identifies a location of a paragraph in the memory device.

To map the logical addresses to physical addresses, a determination must be made as to whether the row and column portions of each logical address identifies a physical address location including parity data. If a logical address identifies a physical address location in the memory device including parity data, then the logical address is incremented until the row and column portions of the logical address identify a physical address location not including parity data. The mapping is then conducted by setting the column and row portions of the physical address to the column and row portions of one of the: (i) logical address upon determining that the logical address does not identify a physical address location including parity data and (ii) the incremented logical address upon determining that the logical address identifies a physical address location including parity data.

In preferred embodiments, the logical addresses presented for mapping are sequential addresses.

In yet further embodiments, an address buffer stores the mapped physical addresses. The mapped physical addresses are subsequently accessed from the address buffer and used to access the physical address locations in the memory device for read or write operations.

It is an object of preferred embodiments of the present invention to reduce the clock cycles needed to access a memory device, such as a DRAM, and increase the buffer bandwidth of the memory device without having to increase the memory device clock speed.

It is a further object of the invention to translate all logical addresses to physical addresses prior to memory access operations or in parallel with other operations such that the translation process will have a negligible effect on memory access time.

BRIEF DESCRIPTION OF DRAWINGS

Referring now to the drawings in which like reference numbers represent corresponding parts throughout:

FIG. 4 is a flowchart that illustrates general logic used to read data from a DRAM in accordance with a preferred embodiment of the present invention;

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

The Structure and Hardware Environment of the DRAM

Figures 1, 2:
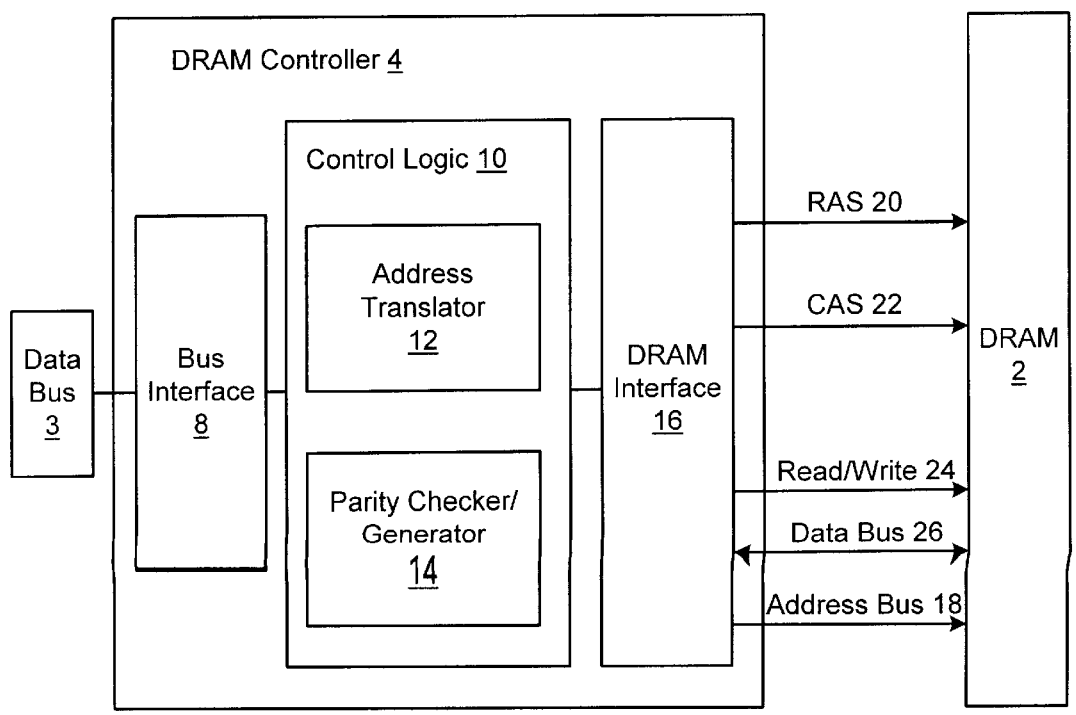
FIG. 1 illustrates an arrangement of data in a DRAM in accordance with a preferred embodiment of the present invention.
FIG. 2 is a block diagram illustrating an exemplary hardware environment used to implement a preferred embodiment of the invention.

FIG. 1 illustrates an arrangement of data in accordance with a preferred embodiment of an extended page mode DRAM 2. In this extended page mode embodiment, data is stored in thirty-two paragraph blocks, P0 through P31. Each paragraph (P) is comprised of 64 bytes (16×32 bits) stored in sixteen columns. In preferred embodiments, paragraphs P0 through P29 contiguously store data and paragraphs P30 and P31 store parity codes for the paragraphs P0–P29. For instance, the first column in P30 would store the parity code for P0, the second column in P30 would store the parity code for P1, up until the last column in P30 which stores the parity code for P15. The first column in P31 stores the parity code for P16, the second column in P31 stores the parity code for P17, up until the fourteenth column in P31 which stores the parity code for P29. In preferred embodiments, data is written to all the columns in a row before writing data to the next row.

FIG. 2 illustrates a preferred embodiment of a hardware environment for accessing the DRAM 2. A data bus 3 provides bus communication between a DRAM controller 4 and other input/output devices (not shown). The DRAM controller 4 interfaces between the data bus 3 and the DRAM 2 to control the flow of data therebetween. The DRAM controller 4 includes various logic components, including a bus interface 8, control logic 10, which further includes an address translator 12 and a parity checker/generator 14, and a DRAM interface 16

The data bus 3 communicates a request to access the DRAM 2. Such request would include the logical addresses of locations in the DRAM to access, control signals indicating whether the request involves a read or write operation, and data paragraphs to be written in the DRAM if the request is a write request. In further embodiments there may be multiple busses, such as busses to provide host data from a SCSI or IDE peripheral storage device, formatted data from a formatter, and read/write requests from a microprocessor.

The bus interface 8 includes logic to control the flow of data from the data bus 3 to the DRAM 2. The bus interface 8 would include arbitration logic to assign priority to requests presented from the data bus 3 or multiple data buses 3 in order to insure there is only one access to the DRAM 2 at a time. For instance, the following requests are listed in order from highest to lowest priority rank: a request from a magnetic disc to write formatted data to the DRAM 2; a request to refresh the DRAM 2; a request to write data from a SCSI device; and a read/write request from a microprocessor. A bus structure including multiple busses coupled to a DRAM controller to access a DRAM is discussed in U.S. Pat. No. 5,280,601, entitled "Buffer Memory Control System for a Magnetic Disc Controller," to Dhiru N. Desai et al., which was incorporated by reference in its entirety above.

The control logic 10 includes the address translator 12 and the parity checker/generator 14. The control logic also performs other Direct Memory Access (DMA) operations to transfer data between the DRAM 2 and the data bus 3. The address translator 12 translates the logical addresses received from the data bus 3 via the bus interface 8 and generates physical addresses of the actual locations in the DRAM 2. In preferred embodiments, the address translator 12 includes logic, discussed below, to derive the physical column and row addresses directly from the logical address included in the cluster transfer request. The logical address maps directly to the physical address, except when the logical address identifies a parity paragraph location in the DRAM 2. In such case, the address translator 12 skips those parity paragraph locations and maps the logical address to the next data paragraph. In this way, there is no need to use time consuming mapping or other address conversion techniques.

The parity checker/generator 14 includes logic to perform parity operations. When a write request is made, the parity checker/generator 14 receives as input each data paragraph to be stored in the DRAM 2. The parity checker/generator 14 generates a parity code for each data paragraph in a manner discussed below. When a read request is made, the parity checker/generator 14 checks the data paragraphs read from the DRAM 2 with the corresponding parity codes stored in the DRAM 2. In preferred embodiments, the parity checker/generator 14 employs the longitudinal redundancy check method (LRC). The parity/checker generator 14 may also include an error correcting code (ECC) system to correct data errors in the data paragraphs.

The DRAM interface 16 controls communication with the DRAM 2. The DRAM interface 16 receives the physical address to be accessed from the address translator 12, including a row and column portion. To access the row in the DRAM 2, the DRAM interface 16 outputs the row address on address bus 18 and strobes the row location supplied on the address bus 18 with a row access strobe (RAS) signal line 20. To access a column address in the DRAM 2, the DRAM interface 16 outputs the column address on the address bus 18 and strobes the column location at the column address supplied on the address bus 18 with a column access strobe (CAS) signal line 22. The DRAM interface 16 further outputs a read/write (R/W) signal 24 indicating whether data is to be written or read from the accessed location. Data is transferred between the DRAM interface 16 and DRAM 2 via a DRAM data bus 26.

In preferred embodiments involving an EDO or page mode DRAM, the DRAM interface 16 further includes address generation logic to generate the physical column addresses within the paragraph at the accessed physical address. After the DRAM interface 16 strobes the first column within the paragraph, the address generator increments a counter indicating that a column within the paragraph has been strobed. This counter is used to generate the next column address within the paragraph. The DRAM interface 16 uses these generated column addresses to sequentially strobe all the columns within the paragraph. Those skilled in the art will recognize that alternative means may be used to strobe each column within an accessed paragraph.

Figure 3A:
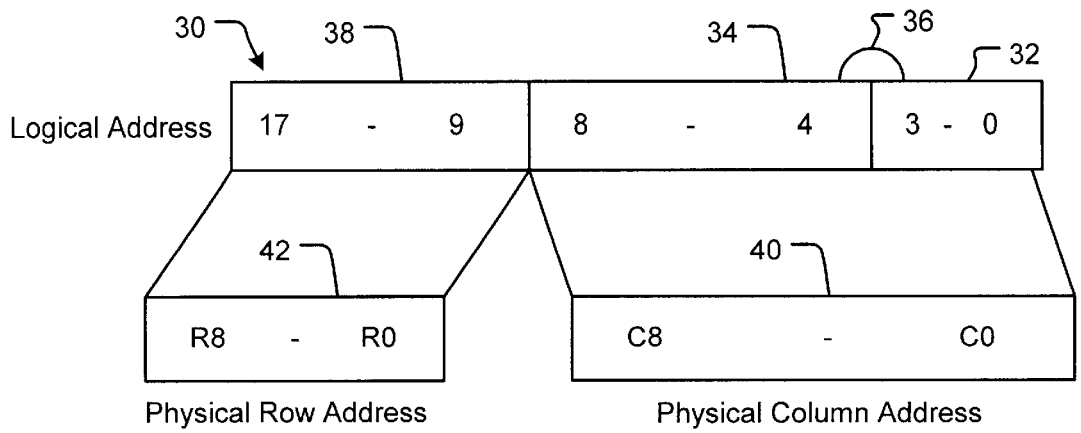
FIG. 3a is a block diagram illustrating how a physical address is directly derived from a logical address.

FIG. 3a illustrates how a logical address is mapped directly to a physical address in the DRAM 2 when the DRAM 2 is a 256 K DRAM chip. The first four bits of a logical address 30, bits 0–3, represent a word counter 32. In the preferred embodiment of FIG. 1, the DRAM 2 is arranged such that there are thirty-two paragraphs per row, wherein each paragraph has sixteen columns. Thus, for each logical address, the first four bits 32 remain the same, indicating that each paragraph or address is sixteen columns long. Addresses differ by the bits in a paragraph portion 34, add(8:4) of the logical address 30, which identifies the paragraph number in the row. A column address 36 in the logical address 30 is comprised of the word counter 32 and the paragraph portion 34. A row portion 38, add(17:9), of the logical address 30, identifies the row address. Thus, the bits in the logical address may be mapped directly to a physical address, wherein the column address 36, add(8:0), in the logical address 30 maps directly to a physical column address 40, C0–C8, and the row portion 38, add(17:9), in the logical address 30 maps directly to the 9 bits in a physical row address 42, R0–R8.

In alternative embodiments, if the paragraph length is comprised of eight or less columns, then the word counter portion 32 would likewise be comprised of fewer bits in the logical address and the physical column address would include additional bits. For instance, if each paragraph was comprised of eight columns, wherein there are 64 paragraphs per row, then the word counter would include address bits add(2:0) and the paragraph portion would comprise bits add(8:3) of the logical address. Still further, the above arrangement is for a 256 K DRAM chip having 512 rows with 512 columns. Those skilled in the art will appreciate that the number of bits in the logical address and physical address derived therefrom may vary depending upon the DRAM row and column arrangement and the number of columns within each paragraph.

Figure 3B:
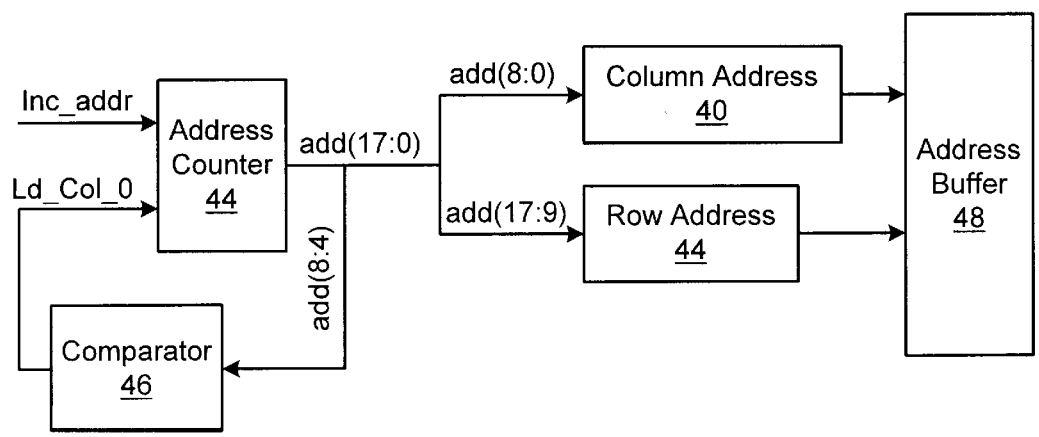
FIG. 3b is a block diagram illustrating an implementation of the logic for converting a logical address to a physical address in accordance with a preferred embodiment of the present invention.

FIG. 3b illustrates a block diagram of a VHDL implementation of the address translator 12 that translates logical addresses to corresponding physical addresses in the DRAM 2. An address counter 44 receives the first logical address in a block of sequential addresses involved in a transfer and derives the first physical address and each sequential physical address from the first logical address in the transfer. The address translator 12 includes a comparator 46 for determining whether the paragraph portion 34 of the logical address 30 is in the paragraph immediately preceding the parity paragraph locations. In the preferred embodiment, the comparator 46 compares the binary value in the paragraph portion 34, add(8:4), with the binary number twenty-nine which represents the paragraph (P29) immediately preceding the parity paragraphs, P30, P31. In this way, the comparator 46 determines if the next paragraph will be a parity paragraph. If the comparator 46 determines that the next paragraph is a parity paragraph (P30), then the comparator 46 generates a Ld_Col_0 signal back to the address counter 44.

The address translator 12 maps the logical address 30 to the physical address by deriving the physical column address 40 and row address 42 directly from the logical address 30. The physical address is then stored in an address buffer 48. The address buffer 48 may be comprised of registers. If there are additional addresses in the cluster to map, the address counter will generate the subsequent logical address from the previously mapped logical address. The address counter 44 will perform one of two operations to generate the next logical address depending on whether a Ld_Col_0 skip signal was generated. If no Ld_Col_0 skip signal was generated, then the address counter 44 will increment the paragraph portion 34 of the previously mapped logical address by binary one. On the other hand, if the address counter 36 received the Ld_Col_0 signal, then the address counter 44 will set the paragraph portion 34 in the previously mapped logical address to binary zero and increment the row portion 38 of the previously mapped logical address 30 by binary one to the next row. In this way, the address counter 44 generates logical addresses that skip the parity paragraphs and proceed to generate the logical address of the first data paragraph in the following row.

In preferred embodiments, the control logic 10 would be able to determine the number of addresses skipped at any given row. The control logic 10 would use this information to increment the first logical address in a cluster transfer by the number of paragraphs or address locations skipped. This incremented first logical address is then, presented to the address counter 44 as the initial logical address at which to begin mapping of the logical addresses to physical addresses. In this way, the first logical address in a cluster transfer is adjusted to account for previously skipped addresses.

In the preferred embodiment, the address counter 44 maps the sequential logical addresses in a cluster transfer to physical addresses and stores the mapped addresses in the address buffer 48 prior to DRAM 2 access operations. In this way, no discernible amount of clock time is spent translating or mapping the logical to physical addresses as the logical address produced from the address counter 36 is mapped directly to the physical column 40 and row 42 addresses.

Those skilled in the art will recognize that the exemplary design of the DRAM controller 4 and the logic components therein, and the extended page mode structure of the DRAM 2 shown in FIG. 1 are not intended to limit the present invention. Indeed, those skilled in the art will recognize that alternative design arrangements for the DRAM controller 4, and components thereof, and the paragraph structure shown in FIG. 1 may be used without departing from the scope of the present invention.

Reading and Writing to the DRAM

Figure 5:
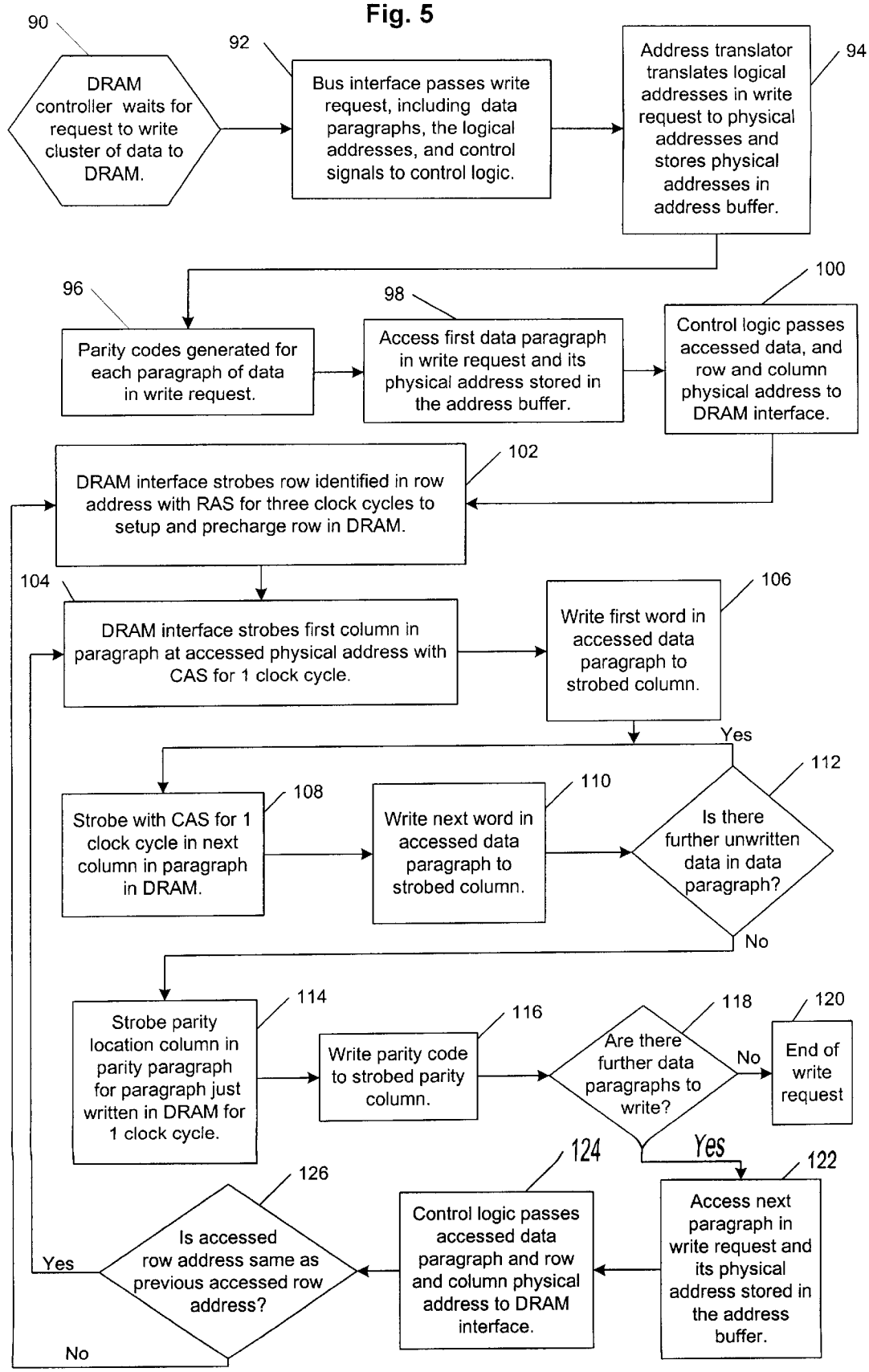
FIG. 5 is a flowchart that illustrates general logic used to write data to a DRAM in accordance with a preferred embodiment of the present invention.
Figure 6:
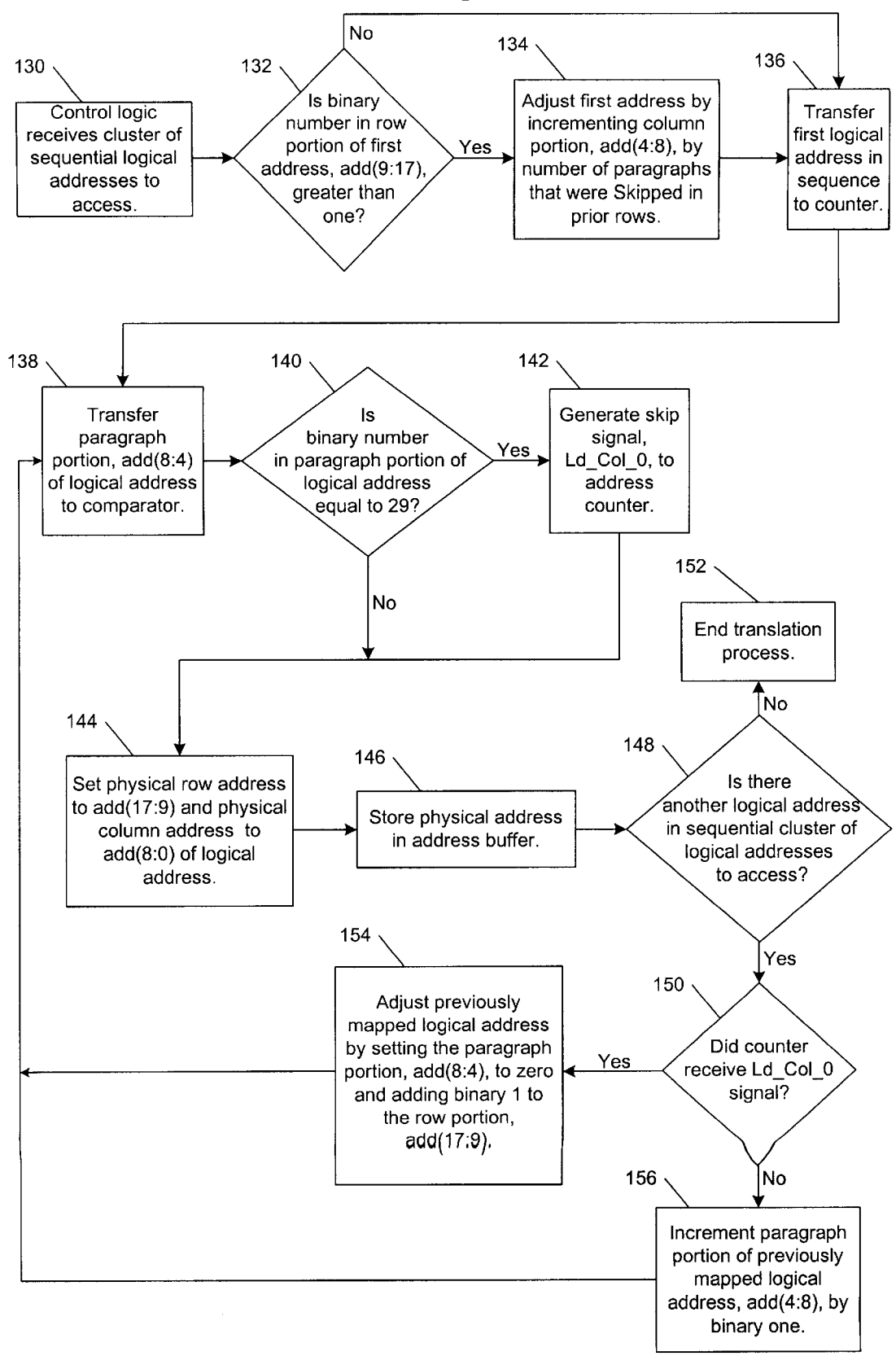
FIG. 6 is a flowchart that illustrates general logic used to map the logical addresses to physical addresses in accordance with a preferred embodiment of the present invention.

FIGS. 4, 5, and 6 are flowcharts illustrating the logic used to read and write to the DRAM 2, respectively. Such logic may be implemented in the firmware of the DRAM controller 4 or as hardware logic (e.g., circuits and gates) in the DRAM controller 4. Those skilled in the art will recognize that this logic is provided for illustrative purposes only and that different logic may be used to accomplish the same results.

FIG. 4 illustrates an embodiment of logic for reading sequential blocks of data, such as a cluster or sector from the DRAM 2, in response to a read request transmitted via the data bus 3. A read request could also come from some other source. For instance, the DRAM control logic 10 could generate a read/write request when generating a refresh signal to refresh the DRAM 2. In preferred embodiments, the logic of FIG. 4 is used to read data from the DRAM 2 of FIG. 1, wherein data is stored contiguously in a row in paragraphs 0 through 29, interrupted only by the parity paragraphs 30 and 31 at the end of each row.

At block 50, the DRAM controller 4 waits for a request to read a cluster of data transmitted from the data bus 3. Control transfers to block 52 which represents the bus interface 8 passing the read request, including the logical addresses to be read and control signals, to control logic 10. Control then transfers to block 54 which represents the address translator 12 translating the logical addresses included in the read request to physical addresses and storing the physical addresses in the address buffer 48 in the manner described below with respect to FIG. 6.

Control then transfers to block 56 which represents the DRAM interface 16 accessing the first physical address in the read request from the address buffer 48. Control transfers to block 58 which represents the control logic 10 transferring the accessed physical address, including the row and column addresses, to the DRAM interface 16. From there, control transfers to block 60 which represents the DRAM interface 16 strobing the row identified in the row address with the row address strobe (RAS) for three clock cycles to setup and precharge the row address in the DRAM 2. Control transfers to block 62 which represents the DRAM interface 16 strobing the column identified in the column address with a column access strobe (CAS) for 1 clock cycle. Control transfers to block 64 which represents the data in the strobed column transferring from the DRAM 2 to the DRAM interface 16 via the DRAM data bus 26.

Block 66 is a decision block representing the DRAM interface 16 determining whether there are further columns in the paragraph at the accessed physical address. As discussed, in preferred embodiments, the DRAM interface 16 includes an address generator to generate the column addresses which the DRAM interface 16 uses to strobe all sixteen columns within the paragraph. The address generator uses a counter to generate column addresses within a paragraph until the counter value indicates that all columns within the paragraph have been accessed. If the counter value indicates there are further columns, control transfers to block 68; otherwise control transfers to block 70. Block 68 represents the DRAM interface 16 strobing the next column in the paragraph with a CAS for 1 clock cycle. From block 68, control transfers back to block 64 which represents the data in the strobed column being transferred from the DRAM 2 to the DRAM interface 16.

After all columns from the paragraph at the accessed physical address have been strobed and the data therein read out, control transfers to block 70 which represents the DRAM interface 16 strobing for one clock cycle the parity column in the parity paragraph associated with the paragraph just read. Control transfers to block 72 which represents the DRAM 2 transferring the parity code to the parity checker/generator 14 to check the paragraph read out of the DRAM 2 with the parity code. Control then transfers to block 74 which is a decision block representing the parity checker/generator 14 determining if there is a parity error in the paragraph just read out of the DRAM 2. If there is a parity error, control transfers to block 76; otherwise control transfers to block 78. Block 76 represents the DRAM controller 4 entering an error mode, such as ECC, to correct the parity error in a manner known in the art.

If there is no parity error, control transfers to block 78 which is a decision block representing the control logic 10 determining whether there are any further addresses stored in the address buffer 48 which have not yet been accessed. If so, control transfers to block 80; otherwise control transfers to block 82. Block 80 represents the control logic 10 transferring all paragraphs read from the DRAM 2 to the data bus 3 via the bus interface 8 for transmittal to the requesting device. If there are further addresses to be read, control transfers to block 82 which represents the control logic 10 accessing the next requested physical address from the address buffer 48 for the next paragraph to be read out of the DRAM 2. Control then transfers to block 84 which represents the control logic 10 passing the row and column addresses of the next accessed physical address to the DRAM interface 16.

Control transfers to block 86 which is a decision block representing the bus interface 16 determining whether the row of the accessed physical address is the same as the previously accessed row. If so, control transfers back to blocks 62 et seq. to strobe the columns in the paragraph at the next accessed physical address. Otherwise, control transfers back to blocks 60 et seq., wherein the DRAM interface 16 must strobe the next row in the DRAM 16 to setup and precharge such row before proceeding to strobe the columns in the next paragraph. With the extended page mode capabilities of the DRAM 2, the DRAM interface 16 need only perform RAS setup and precharge once for all data and parity paragraphs accessed within the same row. RAS setup and precharge is only performed when a paragraph is accessed which is located in a different row than the previously accessed paragraph. During access of paragraphs within a common row, the RAS signal remains active while the columns within the paragraphs are sequentially strobed.

FIG. 5 illustrates logic for writing data to the DRAM 2 in accordance with a preferred embodiment of the present invention. In preferred embodiments, the data bus 3 transmits data in data paragraphs along with an associated logical address of where to store the data paragraph. In the preferred embodiment of FIG. 1, the data paragraphs are written in the DRAM 2 contiguously in each row in paragraphs 0 through 29, wherein contiguous data paragraphs are interrupted only by parity code paragraphs 30 and 31.

Logic begins at block 90 which represents the DRAM controller 4 waiting for a write request from the data bus 3. Upon receiving such request, control transfers to block 92 which represents the bus interface 8 passing the write request, including the data paragraphs to be written, the logical addresses for each data paragraph, and control signals to the control logic 10. Control transfers to block 94, which represents the address translator 12 translating the logical addresses of the data paragraphs to be written to physical addresses and storing such translated physical addresses in the address buffer 48.

Control then transfers to block 96 which represents the parity checker/generator 14 generating parity codes for each data paragraph to be written. Control transfers to block 98 which represents the bus interface 16 accessing the first data paragraph in the write request and the associated physical address in the address buffer 48. Control then transfers to block 100 which represents the control logic 10 passing the accessed data paragraph and associated physical address, comprising row and column addresses, to the DRAM interface 16. Control transfers to block 102 which represents the DRAM interface 16 strobing the row in the DRAM 2 identified by the transferred row address with a RAS strobe for three clock cycles to setup and precharge the row.

After setting up and precharging the row, control transfers to block 104 which represents the DRAM interface 16 strobing the column identified by the column address on the CAS line 22 for one clock cycle. Control transfers to block 106 which represents the bus interface 16 writing the first word (4 bytes) in the accessed data paragraph to the strobed column via the DRAM data bus 26. After the first word in the accessed data paragraph is written to the DRAM 2, control transfers to block 108 which represents the DRAM interface 16 strobing the next column in the paragraph at the accessed physical address with the CAS line 22 for one clock cycle. After strobing, the next word in the accessed data paragraph is written to the strobed column.

Control then transfers to block 112, which is a decision block representing the bus interface 16 determining whether there is further unwritten data in the accessed data paragraph. If so, control transfers back to block 108 to write the next word from the accessed data paragraph to the next column in the DRAM 2; otherwise control transfers to block 114. As discussed, in preferred embodiments, the DRAM interface 16 includes an address generator to generate the addresses of the columns in the paragraph to strobe.

If all data from the accessed data paragraph has been written to the paragraph at the accessed physical address, control transfers to block 114, which represents the bus interface 16 strobing a parity column in the parity paragraph on the CAS line 22 for 1 clock cycle. This strobed parity column stores the parity code for the data paragraph just written in the DRAM 2. Control transfers to block 116, which represents the bus interface 16 writing the generated parity code in the strobed parity column via the DRAM data bus 26. Control then transfers to decision block 118, which represents the control logic 10 determining whether there are any further data paragraphs to write to the DRAM 2. If so, control transfers to block 122; otherwise, control transfers to block 120 which represents the completion of the write request.

If there are further data paragraphs to write to the DRAM 2, control transfers to block 122 which represents the control logic 10 accessing the next data paragraph and associated physical address stored in the address buffer 48. Control then transfers to block 124 which represents the control logic 10 passing the next data paragraph and associated physical address, comprising the next row and column addresses, to the DRAM interface 16.

Control transfers to block 126 which is a decision block representing the bus interface 16 determining whether the next row is the same as the previously accessed row. If so, control transfers back to block 104 and subsequent blocks to strobe all the columns in the paragraph at the accessed physical address. Otherwise, control transfers back to block 102, wherein the DRAM interface 16 must strobe the next row in the DRAM 16 with RAS to setup and precharge the next row prior to strobing the columns in the paragraph at the next physical address. As with the logic of FIG. 4, in FIG. 5, the DRAM interface 16 need only perform precharge and setup strobing once for all paragraphs and associated parity paragraphs accessed within the row. A row is only strobed when paragraphs in a different row are accessed.

FIG. 6 illustrates logic for the address translator 12 to map the logical addresses to physical address locations. Block 130 represents the control logic 10 receiving a cluster of sequential logical addresses from the bus interface 8. Control transfers to block 132 which represents the control logic 10 determining whether the row portion 38 of the first logical address 30, add(17:9), is greater than binary zero. If so, control transfers to block 134, otherwise control transfers to block 136. If the row portion 38 is greater than binary zero, then the first logical address 30 in the cluster is in a row beyond the first row in the DRAM 2. In such case, the starting address must be adjusted to account for addresses skipped in previous rows. In the preferred embodiment of FIG. 1, two parity paragraphs are skipped per row. Thus, the first logical address in the cluster transfer must be adjusted upward by the row number indicated in the row portion 38 plus binary thirty-two as there are two parity paragraphs per row of sixteen locations each. Block 134 represents the control logic 10 incrementing the first logical address in the cluster transfer by the number of addresses skipped in previous rows. Moreover, although not shown in the flowchart of FIG. 6, the control logic 10 should determine whether the first logical address, adjusted or not, identifies a parity paragraph location. If so, then the control logic 10 must increment the first logical address until it identifies a data paragraph. If the first logical address is adjusted for addresses skipped in previous rows and/or to avoid parity paragraphs, then this adjusted first logical address is transferred to the address counter 44 to begin mapping operations.

From blocks 132 or 134, control transfers to block 136, which represents the control logic 10 transferring the first logical address 30, or adjusted first logical address, in the cluster transfer to the address counter 44. Control then transfers to block 138 which represents the address counter 44 transferring the paragraph portion 34, add(8:4), of the logical address 30 to the comparator 46. Control transfers to block 140 which is a decision block representing the comparator 44 determining whether the binary number in the paragraph portion 34, add(8:4), is equal to binary twenty-nine. In the preferred embodiment, binary twenty-nine is used because the parity paragraphs begin at paragraph thirty. Thus, binary twenty-nine represents the data paragraph immediately preceding the parity paragraphs. Thus, the comparator 38 determines whether the next sequential logical address in the cluster transfer will be in one of the parity paragraphs, P30 or P 31. In alternative embodiments, the comparator 38 may compare against a different binary number depending on the columnar location of the parity paragraphs and the paragraph arrangement.

If the comparator 46 determines that the next sequential logical address in the cluster transfer will be in the parity paragraph, then control transfers to block 142 which represents the comparator 46 generating a Ld_Col_0 signal which signals the address counter 44 to skip the next paragraphs and skip to the first paragraph in the subsequent row. Otherwise, control transfers to block 144. From block 142, control also transfers to block 144. Block 144 represents the address counter 36 setting the physical row address 42 to the row portion 38 of the logical address 30 and the physical column address 40 to the full column address 36 of the present logical address 30. Control then transfers to block 146 which represents the transfer of the mapped physical address 40, 42 to the address buffer 48 for storage.

Control then transfers to block 148 which is a decision block representing the address translator 12 determining whether there is another sequential logical address in the cluster. If so control transfers to block 150 to derive the next physical address from the translated logical address, otherwise control transfers to block 152 which represents the end of the translation process. Block 150 is a decision block representing the address counter 44 determining whether a Ld_Col_0 skip signal was generated during the previous mapping. If so control transfers to block 154 to skip the parity paragraphs; otherwise control transfers to block 156. Block 154 represents the address counter 44 adjusting the previously mapped logical address by setting the paragraph portion 34 to binary zero and incrementing the row portion 38 by binary one in order to skip to the first paragraph in the next row. If the address counter 44 did not receive the skip signal, Ld_Col_0, then control transfers to block 156 which represents the address counter 44 incrementing the paragraph portion 34 of the previously mapped logical address by binary one to generate the next sequential logical address 30 in the row. From blocks 154 or 156, control transfers back to block 138 to derive the next physical address from the adjusted or incremented logical address 30 until there are no further sequential logical addresses in the cluster.

Improved Timing for DRAM Accessing

The number of clock cycles required to access n paragraphs of data during a read or write access request can be calculated as follows. With the logic of FIGS. 4–5, it takes 20 clock cycles to access the first paragraph in a cluster of paragraphs included in a read/write request: three clock cycles for RAS setup and precharge; sixteen clock cycles to access each column within the paragraph at the accessed physical address; and one clock cycle to access the parity column. To access the remaining paragraphs in the row, it takes only seventeen clock cycles; sixteen clock cycles to access each column within the paragraph and one clock cycle to access the parity column associated with the accessed paragraph. By increasing the number of data paragraphs stored contiguously in the same row with the extended page mode discussed herein and by locating the parity codes in parity paragraphs at the end of the row, the logic described with respect to FIGS. 4 and 5 minimizes the number of clock cycles needed to access contiguous paragraphs of data stored in the DRAM 2.

In the preferred embodiments of FIGS. 1, 4, and 5, the average clock cycles to access n paragraph when n≦30 can be expressed by equation (1) as follows:

$$\frac{[20 + 17*(n-1)]}{n} = 17 + 3/n \quad (1)$$

The average access cycle time when n>30 must account for the 3 clock cycles of RAS required to access the next row of paragraphs because in the embodiment of FIG. 1 there are only thirty data paragraphs per row. The average clock cycles to access a paragraph when n>30 can be expressed by equation (2) as follows, where INT represents the integer part of the value:

(2) The buffer bandwidth to transfer n paragraphs for a DRAM clock speed of C can be expressed by equations (3) and (4), as follows:

$$\left[\frac{C}{(17 + 3/n)}\right] * 64 \, \text{MB/s, when } n \leq 30. \quad (3)$$

$$\frac{C}{[513 * \text{INT}(n/30) + 20 + 17 * (n - 30)]} \times 64 \, \text{MB/s, when } n > 30. \quad (4)$$

Table 1, below, presents the calculated average access clock cycles and buffer bandwidths using the equations (1), (2), (3), and (4) with a DRAM clock speed (C) of 50 MHz.

| NUMBER PARAGRAPHS (N) | AVERAGE ACCESS CYCLE | BANDWIDTH (MB/S AT 50 MHZ) |
|---|---|---|
| 1 | 20.00 | 160.0 |
| 2 | 18.50 | 173.0 |
| 3 | 18.00 | 177.8 |
| 6 | 17.50 | 182.9 |
| 32 (1-sector) | 17.19 | 186.2 |
| 64 (2-sectors) | 17.14 | 186.7 |
| Infinite | 17.00 | 188.2 |

In present DRAM access schemes, the physical address must be translated for each paragraph access. This requires RAS clock cycles to setup and precharge the row for each paragraph access. When each paragraph access requires setup and precharge clock cycles, the minimum average paragraph access time is 20 clock cycles, 3 clock cycles to setup and precharge the row, 16 clock cycles to strobe each column in the paragraph, and 1 clock cycle to strobe the parity column. By performing all address translation with the address translator 12 and providing a longer active RAS with extended page mode, the preferred embodiments disclosed herein avoid the need to setup and precharge the row with each paragraph access. Moreover, the translation operations performed by the address translator 12 of the preferred embodiments does not effect cycle access time because translation occurs prior to DRAM access, such as during setup time or in parallel with other activities.

If the DRAM clock runs at 50 MHz, the buffer bandwidth for present schemes providing a twenty clock cycle average access time reaches 160 MB/s (50 MHz*20 cycles*64). With the logic of FIGS. 4–6, the buffer bandwidth reaches 188 MB/s. Thus, the present invention increases bandwidth without increasing the DRAM 2 clock rate.

Conclusion

This concludes the description of the preferred embodiments of the invention. The following describes some alternative embodiments for accomplishing the present invention.

Preferred embodiments are described with respect to a DRAM memory device. However, the memory access scheme of the preferred embodiments may apply to different types of DRAM chips, such as DIPs, SIMMs, and SIPs or alternative memory devices, such as an SRAM memory unit. Further, the access scheme of the present invention is described with respect to a 256K×16 DRAM utilizing extended page mode. However, those skilled in the art will recognize that the access scheme of the present invention may apply to DRAMs of different sizes (512K, 1 Mb, etc.) utilizing different page mode systems (e.g., normal page mode RAM, Fast Page Mode RAM, Extended Data Output RAM, synchronous DRAM (SDRAM), etc.)

Preferred embodiments are described with respect to an extended page mode memory arrangement having thirty-two paragraphs of data per row. This memory arrangement is intended to maximize the number of contiguous data paragraphs to speed up memory access. Notwithstanding, the present invention may apply to memory arrangements having a row/column arrangement different than the arrangement described with respect to FIG. 1, i.e., data addressed in sixty-four byte paragraphs, with thirty data paragraphs and two parity paragraphs per row. For instance, data may be addressed in paragraphs having a length different than sixty-four bytes and/or each row may contain a number of paragraphs different than thirty-two. Moreover, if a different row/column and/or paragraph arrangement is utilized, the mapping of the logical address to the physical address would differ from the mapping shown in FIG. 3a.

The block diagram of FIG. 2 is intended for illustrative purposes only to generally describe the functions performed by the DRAM controller 4. Those skilled in the art will recognize that functions performed by the DRAM controller 4 as described with reference to FIG. 2 may be carried out in a manner different from that described above. Further, the components of the DRAM controller 4, including the bus interface 8, control logic 10, address translator 12, address counter 44, comparator 46, address buffer 48, parity checker/generator 14, and DRAM Interface 16, may be implemented with hardware logic (e.g., gates and circuits), firmware or a combination thereof. Still further, certain of the components of the DRAM controller 4 may be implemented in hardware and firmware logic located in circuit components external to the DRAM controller 4.

Moreover, events may occur at times different than the times described above. For instance, parity checking or generation may occur in a manner different than that described above. A parity code may be generated continuously while data is being transferred to the DRAM interface 16 as opposed to the parity codes being generated all at once before transfer during set-up. Moreover, the address translator 12 may translate logical to physical addresses at a time other than prior to DRAM 2 access operations.

In summary, the present invention discloses a system for mapping each of a plurality of logical addresses to a physical address which identifies a location in a memory device. The memory device has a plurality of columns and rows, wherein each row has a plurality of data paragraphs including data and at least one parity paragraph including parity data. Each paragraph is comprised of a plurality of contiguous columns. A physical address identifies a location of a paragraph in the memory device.

To map the logical addresses to physical addresses, a determination must be made as to whether the row and column portions of each logical address identify a physical address location including parity data. If a logical address identifies a physical address location in the memory device including parity data, then the logical address is incremented until the row and column portions of the logical address identify a physical address location not including parity data. The mapping is then conducted by setting the column and row portions of the physical address to the column and row portions of one of the: (i) logical address upon determining that the logical address does not identify a physical address location including parity data and (ii) the incremented logical address upon determining that the logical address identifies a physical address location including parity data.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for mapping each of a plurality of logical addresses to a physical address identifying a location in a memory device, wherein the memory device has a plurality of columns and rows, wherein each row has a plurality of data paragraphs including data and at least one parity paragraph including parity data, wherein each paragraph is comprised of a plurality of contiguous columns, and wherein a physical address identifies a location of a paragraph in the memory device, comprising the steps of:
   (a) for each logical address, determining whether the row and column portions of a logical address identify a physical address location including parity data;
   (b) upon determining that a logical address identifies a physical address location in the memory device including parity data, incrementing the logical address until the row and column portions of the logical address identify a physical address location not including parity data; and
   (c) setting the column and row portions of the physical address to the column and row portions of one of the: (i) logical address upon determining that the logical address does not identify a physical address location including parity data and (ii) the incremented logical address upon determining that the logical address identifies a physical address location including parity data.

2. The method of claim 1, wherein the plurality of logical addresses are sequential addresses.

3. The method of claim 2, further comprising the step of generating a logical address for each logical address following a first logical address in the sequence of logical addresses by incrementing the column portion of a previously mapped logical address by one paragraph, wherein the first logical address and the generated logical addresses are mapped to physical addresses.

4. The method of claim 3, wherein each row in the memory device includes thirty contiguous data paragraphs storing data and two paragraphs storing parity data, wherein the step of incrementing the logical address upon determining that the logical address identifies a physical address location in the memory device including parity data comprises setting the column portion of the logical address to a column address of a data paragraph and incrementing the row portion of the logical address to identify a subsequent row location.

5. The method of claim 4, wherein the step of determining whether the row and column portions of a logical address identify a physical address location including parity data comprises the step of determining with a comparator whether a column address of the previously mapped logical address is equivalent to a column address of a data paragraph immediately preceding a parity paragraph.

6. The method of claim 5, wherein the first thirty paragraphs in a row are data paragraphs and the following two paragraphs are parity paragraphs, wherein the column portion of the logical address includes a paragraph portion identifying a paragraph in a row, wherein the step of determining with the comparator comprises determining whether the paragraph portion of the previously mapped logical address is equal to binary twenty-nine, wherein binary twenty-nine identifies the data paragraph immediately preceding the parity paragraphs.

7. The method of claim 1, wherein the mapped physical addresses are stored in an address buffer.

8. The method of claim 1, wherein the logical addresses are mapped to physical addresses before any of the physical address locations in the memory device are accessed.

9. A device for mapping each of a plurality of logical addresses to a physical address identifying a location in a memory device, wherein the memory device has a plurality of columns and rows, wherein each row has a plurality of data paragraphs including data and at least one parity paragraph storing parity data, wherein each paragraph is comprised of a plurality of contiguous columns, and wherein a physical address identifies a location of a paragraph in the memory device, comprising:
   (a) means for determining whether the row and column portions of each logical address identify a physical address location including parity data;
   (b) means for incrementing the logical address until the row and column portions of the logical address identify a physical address location not including parity data upon determining that a logical address identifies a physical address location in the memory device storing parity data; and
   (c) means for setting the column and row portions of the physical address to the column and row portions of one of the: (i) logical address upon determining that the logical address does not identify a physical address location in the memory device including parity data and (ii) the incremented logical address after incrementing the logical address.

10. The device of claim 9, wherein the plurality of logical addresses are sequential addresses, further comprising means for generating a logical address for each logical address following a first logical address in the sequence of logical addresses by incrementing the column portion of a previously mapped logical address by one paragraph, wherein the first logical address and the generated logical addresses are mapped to physical addresses.

11. The device of claim 10, wherein each row in the memory device includes thirty contiguous data paragraphs storing data and two paragraphs storing parity data, wherein the means for incrementing the logical address upon determining that the logical address identifies a physical address location including parity data comprises means for setting the column portion of the logical address to a column address of a data paragraph and incrementing the row portion of the logical address to identify a subsequent row location.

12. The device of claim 11, wherein the means for determining whether the row and column portions of a logical address identify a physical address location including parity data comprises a comparator, wherein the comparator includes logic to determine whether a column address of the previously mapped logical address is equivalent to a column address of a data paragraph immediately preceding a parity paragraph.

13. The device of claim 12, wherein the first thirty paragraphs in a row are data paragraphs and the following two paragraphs are parity paragraphs, wherein the column portion of the logical address includes a paragraph portion identifying a paragraph in a row, wherein the comparator further includes means for determining whether the paragraph portion of the previously mapped logical address is equal to binary twenty-nine, wherein binary twenty-nine identifies the data paragraph immediately preceding the parity paragraphs.

14. The device of claim 9, further including an address buffer to store the physical addresses mapped from the logical addresses.

15. The device of claim 9, wherein the logical addresses are mapped to physical addresses before any of the physical addresses in the memory device are accessed.

16. A memory access system, comprising:
 (a) a memory device having a plurality of rows and columns, wherein each row has a plurality of data paragraphs including data and at least one parity paragraph including parity data, wherein each paragraph is comprised of a plurality of contiguous columns, and wherein a physical address identifies a location of a paragraph in the memory device;
 (b) means for mapping a logical address to a physical address in the memory device, wherein each logical address and physical address have a column portion and a row portion, further comprising:
  (1) means for determining whether the row and column portions of each logical address identify a physical address location including parity data;
  (2) means for incrementing the logical address until the row and column portions of the logical address identify a physical address location not including parity data upon determining that the logical address identifies a physical address location in the memory device storing parity data; and
  (3) means for setting the column and row portions of the physical address to the column and row portions of one of the: (i) logical address upon determining that the logical address does not identify a physical address location in the memory device including parity data and (ii) the incremented logical address after incrementing the logical address;
 (c) means for accessing a mapped physical address, including row and column portions; and
 (d) means for accessing the mapped physical address locations in the memory device.

17. The memory access system of claim 16, wherein the means for accessing the mapped physical address locations in the memory device further comprises:
 a row access strobe (RAS);
 a column access strobe (CAS);
 logic for causing the RAS to strobe a row in the memory device at a row portion of the accessed physical address to setup and precharge the row;
 logic for causing the CAS to strobe all columns in the paragraph at the accessed physical address location;
 logic for accessing a next mapped physical address including the next row and column addresses;
 logic for determining whether the next row address is the same as the row address in the previously accessed physical address; and
 logic for strobing the row in the memory device at the next row address to setup and precharge the row upon determining that the next row address is different than the row address already setup and precharged.

18. The memory access system of claim 17, further including logic for reading data from the strobed columns.

19. The memory access system of claim 17, wherein for a mapped physical address there is an associated data paragraph comprised of data, further including logic for writing the data in the data paragraph to the strobed columns in the paragraph location at the associated physical address.

20. The memory access system of claim 19, further comprising means for generating a parity code for a data paragraph and means for writing the parity code to a parity location in a parity paragraph.

21. The memory access system of claim 20, wherein the parity code is written in the row where the data in the data paragraph for which the parity code was generated is stored.

22. The memory access system of claim 16, wherein the plurality of logical addresses are sequential addresses, further comprising means for generating a logical address for each logical address following a first logical address in the sequence of logical addresses by incrementing the column portion of a previously mapped logical address by one paragraph, wherein the first logical address and the generated logical addresses are mapped to physical addresses.

23. The memory access system of claim 22, wherein each row in the memory device includes thirty contiguous data paragraphs storing data and two paragraphs storing parity data, wherein the means for incrementing the logical address upon determining that the logical address identifies a physical address location in the memory device storing parity data comprises means for setting the column portion of the logical address to a column address of a data paragraph and incrementing the row portion of the logical address to identify a subsequent row location.

24. The memory access system of claim 23, wherein the means for determining whether the row and column portions of a logical address identify a physical address location including parity data comprises a comparator, wherein the comparator includes logic to determine whether a column address of the previously mapped logical address is equivalent to a column address of a data paragraph immediately preceding a parity paragraph.

25. The memory access system of claim 24, wherein the first thirty paragraphs in a row are data paragraphs and the following two paragraphs are parity paragraphs, wherein the column portion of the logical address includes a paragraph portion identifying a paragraph in a row, wherein the comparator further includes means for determining whether the paragraph portion of the previously mapped logical address is equal to binary twenty-nine, wherein binary twenty-nine identifies the data paragraph immediately preceding the parity paragraphs.

26. The memory access system of claim 16, further including an address buffer to store the physical addresses mapped from the logical addresses.

27. The memory access system of claim 16, wherein the logical addresses are mapped to physical addresses before any of the physical addresses in the memory device are accessed.

* * * * *